(12) United States Patent
Kunz

(10) Patent No.: US 8,453,304 B2
(45) Date of Patent: Jun. 4, 2013

(54) DEVICE FOR COVERING A MACHINE IN A PRODUCTION LINE COMPRISING A PLURALITY OF MACHINES

(75) Inventor: Simon Kunz, Ettenhausen (CH)

(73) Assignee: Mueller Martini Holding AG, Hergiswil (CH)

( * ) Notice: Subject to any disclaimer, the term of this patent is extended or adjusted under 35 U.S.C. 154(b) by 1026 days.

(21) Appl. No.: 12/437,922

(22) Filed: May 8, 2009

(65) Prior Publication Data

US 2009/0280971 A1 Nov. 12, 2009

(30) Foreign Application Priority Data

May 9, 2008 (EP) .................................... 08156009

(51) Int. Cl.
*B23P 23/00* (2006.01)
*E05D 15/50* (2006.01)
*E05D 7/10* (2006.01)

(52) U.S. Cl.
CPC ............ *E05D 15/505* (2013.01); *E05D 7/1072* (2013.01)
USPC ............... 29/33 R; 29/564; 101/480; 49/382; 49/193; 16/231; 74/608

(58) Field of Classification Search
USPC ........... 29/33 R, 563, 564, DIG. 56, DIG. 60; 16/231, 230, 232; 49/382, 193; 101/480, 101/693, 689, 690; 74/608, 609; 82/152; 451/451
See application file for complete search history.

(56) References Cited

U.S. PATENT DOCUMENTS

| 3,398,674 | A | * | 8/1968 | Venable | 16/231 |
| 5,195,272 | A | * | 3/1993 | Yamada | 16/231 |
| D374,391 | S | * | 10/1996 | Mele | D8/323 |
| 5,651,164 | A | * | 7/1997 | DeMarco | 16/230 |
| 5,829,197 | A | * | 11/1998 | Oh | 16/231 |
| 6,951,172 | B2 | * | 10/2005 | Detmers et al. | 101/480 |
| 6,997,108 | B2 | * | 2/2006 | Tabuchi et al. | 101/217 |

FOREIGN PATENT DOCUMENTS

| EP | 1 291 140 B1 | 3/2003 |
| GB | 2 288 861 A | 11/1995 |
| GB | 2 304 632 A | 3/1997 |
| JP | 2005-041563 A * | 2/2005 |

OTHER PUBLICATIONS

Machine translation of JP 2005-041563, which JP '563 was published Feb. 2005.*
European Search Report dated Aug. 28, 2008, issued in corresponding European Patent Application No. 08156009.6, along with its corresponding English language translation.

* cited by examiner

*Primary Examiner* — Erica E Cadugan
(74) *Attorney, Agent, or Firm* — Venable LLP; Robert Kinberg

(57) ABSTRACT

An arrangement for covering a machine having a machine frame, includes a covering device adapted to be attached to the machine frame above the machine. The covering device has opposite sides corresponding to opposite sides of the machine frame. Hinges are respectively connected at the opposite sides of the covering device about which the covering device can be selectively swiveled to an open or a closed position relative to the machine. Each one of the respectively arranged hinges at opposite sides of the covering device is selectively coupled to the machine frame and has a parallel-extending swiveling axis. Respectively the non-selected hinge that does not form the swiveling axis for opening the covering device is arranged to be detachable from the machine frame.

7 Claims, 6 Drawing Sheets

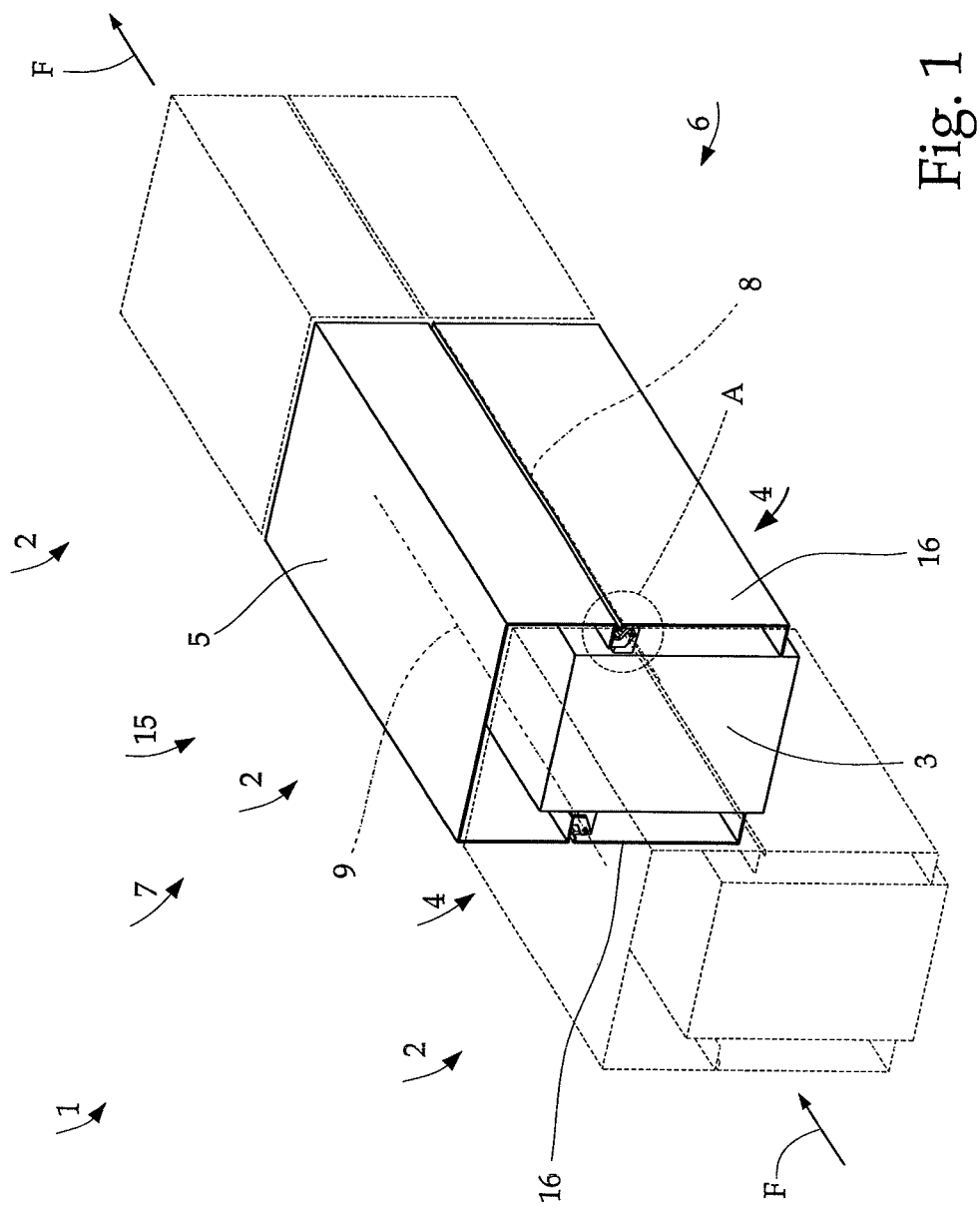

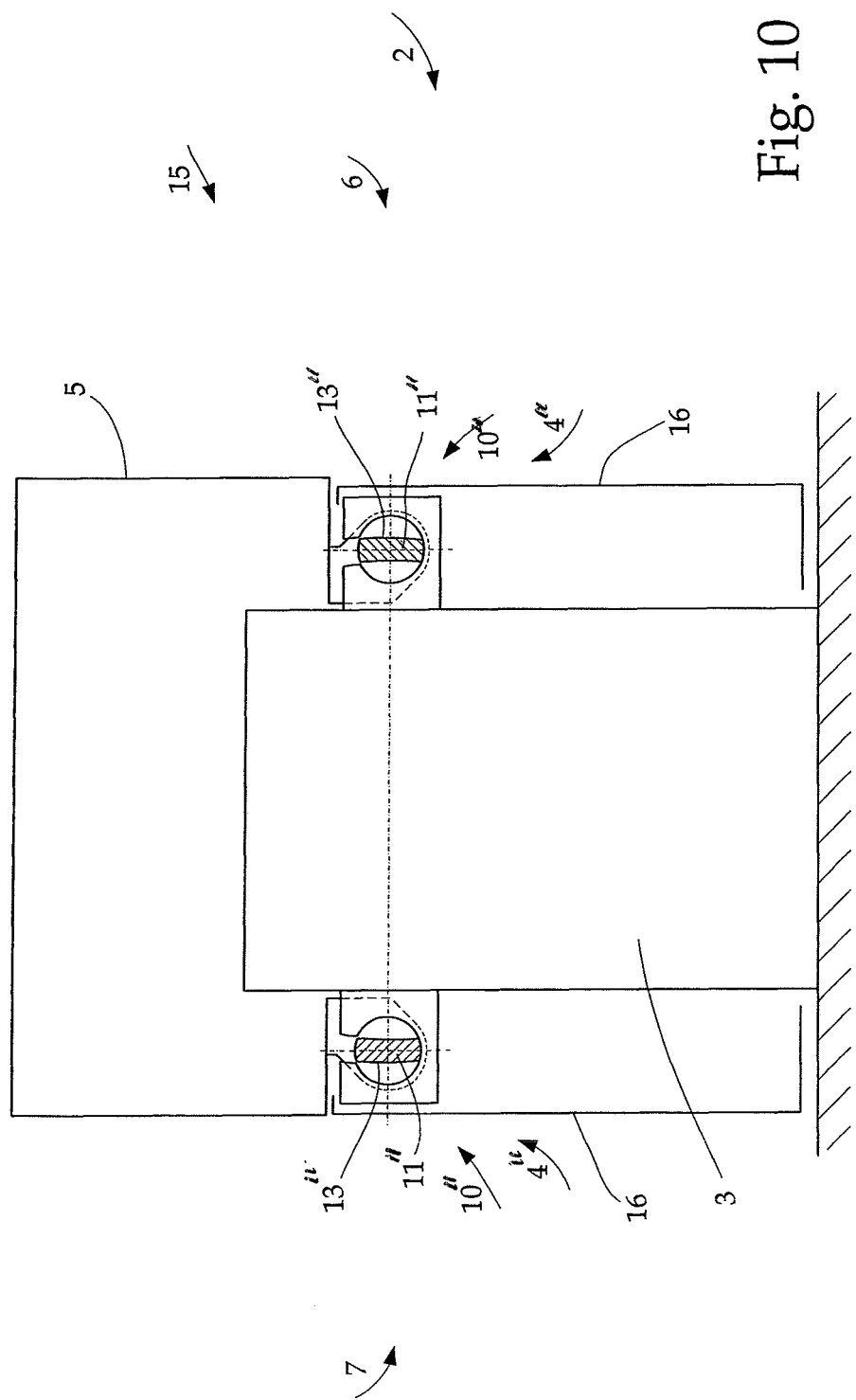

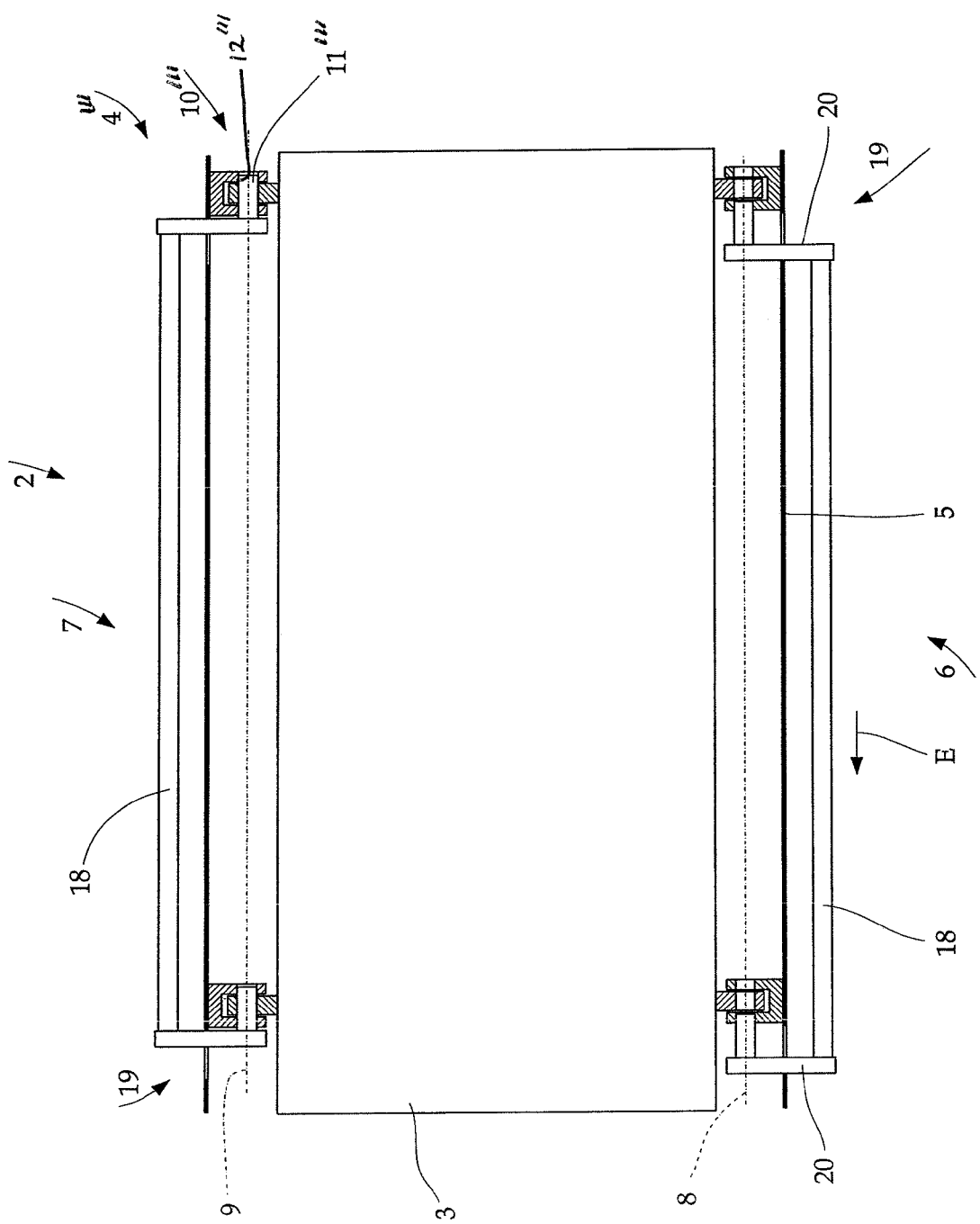

DEVICE FOR COVERING A MACHINE IN A PRODUCTION LINE COMPRISING A PLURALITY OF MACHINES

CROSS-REFERENCE TO RELATED APPLICATION

This application claims the priority of European Patent Application No. 08156009.6, filed on May 9, 2008, the subject matter of which is incorporated herein by reference.

BACKGROUND

The invention relates to a device for covering an apparatus or a machine, preferably disposed in a processing line comprising several machines for producing printed products, wherein the covering device is arranged above the machine and is attached with the aid of hinges to the machine frame, such that it can be swiveled to an open or a closed position.

Semi-finished products such as printed sheets, casings and covers, cards or inserts are processed further in systems designed for further print processing to obtain finished products. A plurality of processing steps must normally be realized on a plurality of different machines for turning the semi-finished products into finished products. Once the semi-finished printed products have been supplied to the machines, it is advantageous if all operating steps for obtaining the finished printed products can be carried out automatically and successively. Several machines are therefore connected to form a system or production line to which the semi-finished products are supplied. The products are then conveyed through the system in a serial flow from machine to machine and are processed in such machines. The line-type configuration of such a system permits access to the machines from two sides only, generally from the two opposite-arranged sides, because one side is intended for feeding in the semi-finished products and the other side for removing the products. The conveying of the semi-finished printed products and the processing of these products in the machines results in danger zones along the production line, which must be covered during the operation for safety reasons by using covering devices. However, the operators should also have as much access as possible to the processing devices on the machines for adjustment and maintenance operations.

Covering devices that are embodied as sliding doors are known in the art, wherein these sliding doors can be displaced in a longitudinal and/or conveying direction of the semi-finished printed products by moving them along rails connected to the machine frame. This type of covering device has the advantage of providing access simultaneously from two opposite-arranged sides. The disadvantage is that only a limited section of the machine can be accessed freely at the same time because the remaining section is covered by the displaced sliding doors.

Covering devices are also know which are embodied as one-piece, swiveling hoods that are positioned on the machine frame and can be swiveled around an axis extending parallel to the conveying direction for the semi-finished products. These covering devices are designed such that when the covering device is open, a very large area along the total length of the machine is accessible. The disadvantage, however, is that the opposite side is not accessible at all.

Covering devices in the form of two-part swiveling hoods are also known, wherein these two-part hoods are positioned on the machine frame, such that they can swivel around at least one axis extending parallel to the conveying direction for the printed products. The swiveling axis can be arranged in a central location above the machine, thereby allowing the two parts of the hood to be swiveled toward each other for the opening, or the axis can be arranged on the sides of the machine frame, meaning on the operating sides, which allows the hood parts to be swiveled away from each other for the opening. Swiveling hoods of this type have the disadvantage that operations are not possible from one side, meaning that free access to the inside components of the machines from two opposite-arranged sides is not possible or only with limitations.

European patent document EP 1 291 140 B1 furthermore discloses a covering hood which is mounted swiveling on the machine housing. Inside a first covering hood, a second covering hood is attached swiveling to the first covering hood. Devices of this type permit optional access from two sides, to be sure, but the access from one side is only possible with limitations.

SUMMARY

It is therefore an object of the present invention to provide a device for covering an apparatus or a machine, preferably disposed in a processing line consisting of several machines, which covering device optionally allows free access to the machines from one operating side or the opposite-arranged side.

The above and other objects are achieved according to the invention wherein there is provided, according to one embodiment, an arrangement for covering a machine having a machine frame, comprising: a covering device adapted to be attached to the machine frame above the machine, the covering device having opposite sides corresponding to opposite sides of the machine frame; and hinges respectively connected at the opposite sides of the covering device about which the covering device can be selectively swiveled to an open or a closed position relative to the machine, wherein each one of the respectively arranged hinges at opposite sides of the covering device is selectively coupled to the machine frame and has a parallel-extending swiveling axis, and wherein respectively the non-selected hinge that does not form the swiveling axis for opening the covering device is arranged to be detachable from the machine frame.

BRIEF DESCRIPTION OF THE DRAWINGS

These and other features and advantages of the invention will be further understood from the following detailed description, with reference to the accompanying drawings.

FIG. 1 is a perspective view of a machine disposed in a processing line, with the covering device closed.

FIG. 10 is a cross section through a machine provided with hinges, according to another embodiment.

FIG. 11 is a partial sectional view of a machine with hinges according to a further embodiment, as seen from above.

DETAILED DESCRIPTION

Figure 3:
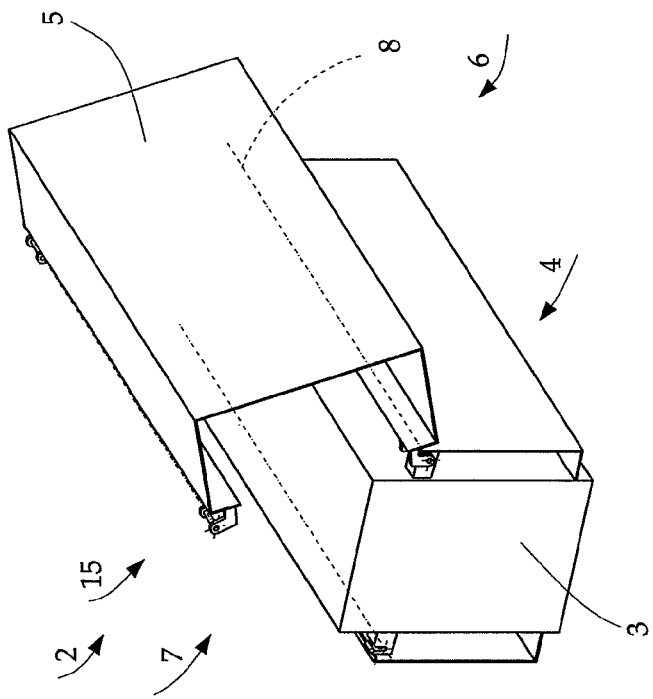
FIG. 3 is a perspective view of a machine according to FIG. 1, showing the covering device opened toward the front operating side.
Figure 2:
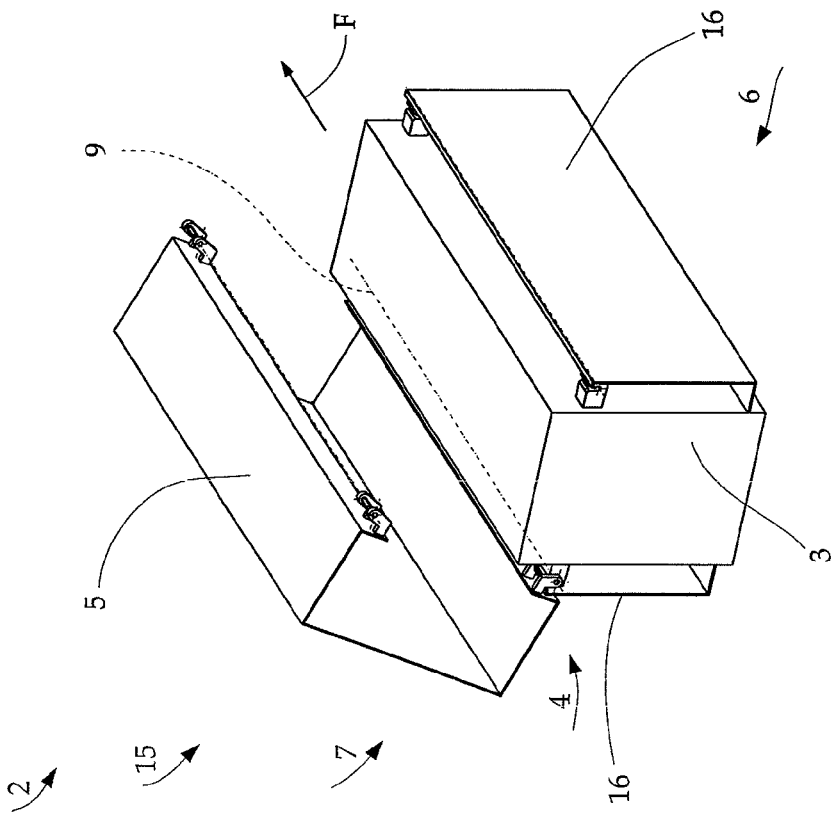
FIG. 2 is a perspective view of a machine according to FIG. 1, showing the covering device opened toward the back operating side.

Referring to FIGS. 1 to 3, there is shown a section of a processing line 1, which includes a plurality of machines 2 for producing printed products. The printed products are conveyed in a conveying direction F through the processing line 1 and are processed during a conveying operation inside the machines 2. Each machine 2 comprises a machine frame 3 with thereon arranged processing devices, as well as covers 15 for the device that includes covering parts 16, attached directly to the machine frame 3, and covering devices 5 that are attached swiveling on hinges 4. The covering device 5 is arranged above the machine 2 and, with the aid of hinges 4 that are connected to the machine frame 3 on the front operating side 6 and the opposite-arranged rear operating side 7, can be swiveled around a parallel extending front swiveling axis 8 or a rear swiveling axis 9 to an open or a closed position. The oppositely arranged hinges that form the swiveling axis 8, 9 for opening the covering device 5 in this case function as detachable hinges.

According to one embodiment, shown in FIGS. 4 to 7, the hinge 4 comprises a circular-segment shaped bearing shaft 11 that includes two detachment surfaces 13 and a bearing 10 that extends parallel to the swiveling axis 8, 9. The hinge is embodied to be detachable in a radial direction. The bearing 10 is provided with a narrowed-down insertion opening 14, formed by opposing flat surfaces 17, which end in the bearing bore 12. The width of insertion opening has a width that at least equals the width of the bearing shaft 11 in the region of the detachment surfaces 13, wherein the bearing shaft 11 and the bearing 10 can be displaced relative to each other.

Figure 7:
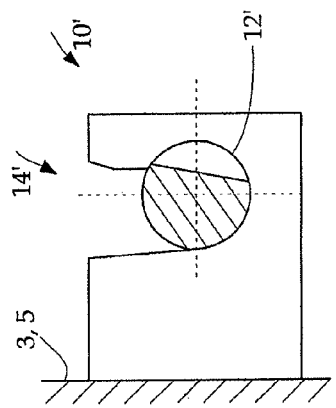
FIG. 7 is a cross section through the hinge according to FIG. 4, but in the locked position.
Figure 8:
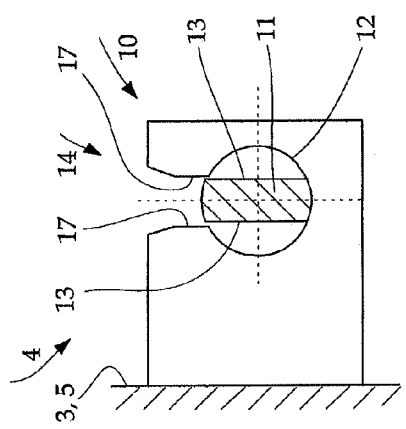
FIG. 8 is a cross section through another embodiment of a hinge with a bearing shaft, showing a single detachment surface in the unlocked position.
Figure 9:
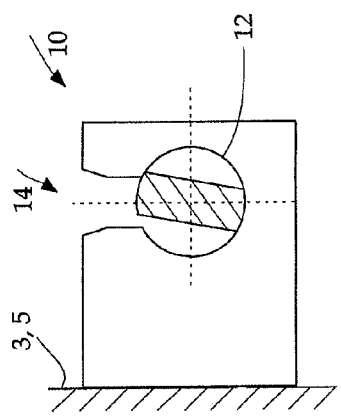
FIG. 9 is a cross section through the hinge according to FIG. 8, in the locked position.

FIGS. 8 and 9 show a variation of the hinge in FIGS. 4 to 7, wherein the hinge 4' comprises a circular segment having a single detachment surface 13 and a bearing 10' having a narrowed down insertion opening 14' that is configured to have one flat surface 17 as in FIGS. 4 to 7, and an opposing flat surface 17' that forms a tangent with the bearing bore 12'.

Figure 5:
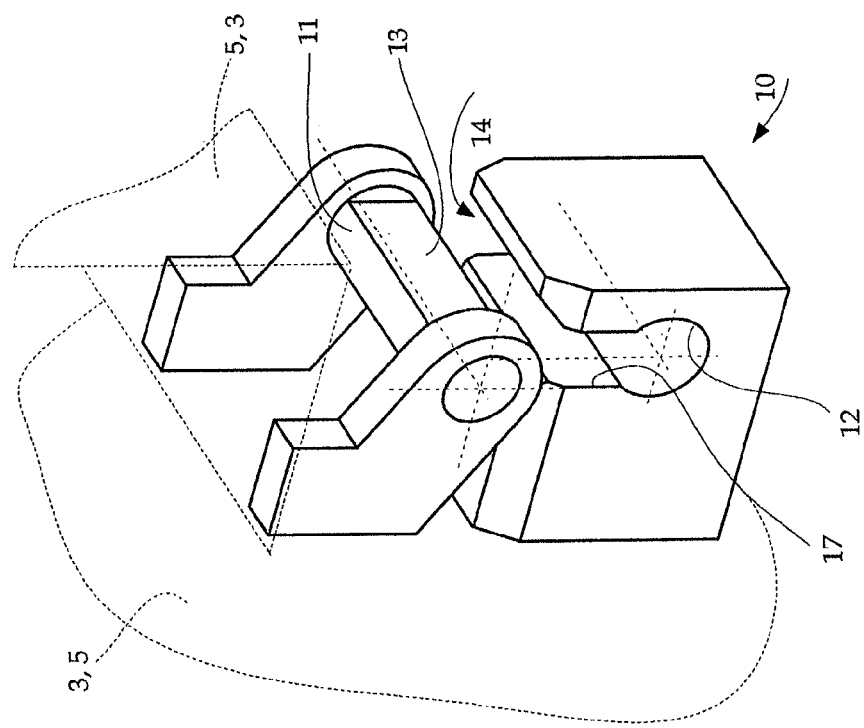
FIG. 5 is a perspective view of a hinge according to FIG. 4, in the detached position.
Figure 4:
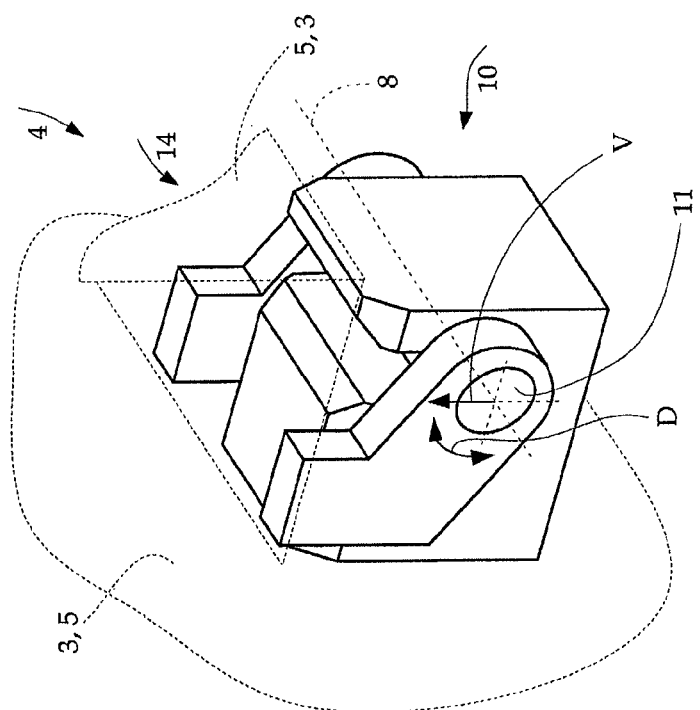
FIG. 4 is an enlarged detail A from FIG. 1, showing a perspective view of a first embodiment of a hinge with a bearing shaft having two surfaces for detaching the hinge.
Figure 6:
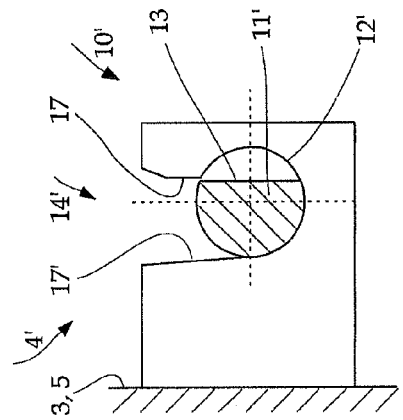
FIG. 6 is a cross section through the hinge according to FIG. 4, in the unlocked position.

Whenever the covering device 5 is closed, the axes for the bearing shafts 11, 11' coincide with the swiveling axes 8, 9. According to FIGS. 4 to 7, the bearing shaft 11 is positioned in the bearing 10 so that it can be turned in the direction of the arrow of rotation D or can be displaced in the direction of arrow V wherein the bearing shaft 11 can be detached as shown in FIG. 5. Following a small rotation of the bearing shaft 11 in the bearing 10, as shown in FIG. 7, the bearing shaft 11 is locked in place in the bearing 10 and can only execute rotational movements in the direction of arrow D. During the swiveling of the covering device 5 around a swiveling axis 8, 9, the bearing shaft 11 moves along a circular path on the opposite side. The insertion opening 14, formed by flat surfaces 17, is embodied such that during the swiveling around the front swiveling axis 8 or the rear swiveling axis 9, the respectively opposite arranged bearing shaft 11, which moves along a circular path, does not collide with the bearing 10. The surfaces 17 of one advantageous design variant are arranged vertically or at such an angle that the width of the insertion opening 14 increases toward the top, thereby making it possible to lift the covering device 5 upward and off the machine frame 3 when the hinge 4 is detached.

The hinge 4' illustrated in FIGS. 8 to 9 operates in a similar manner as the hinge 4 depicted in FIGS. 4 to 7.

According to a further embodiment, shown in FIG. 10, the covering device 5 is embodied such that it can not be lifted off the machine frame 3 when the hinges 4" are detached, wherein at least the bearing shafts 11" have curved detachment surfaces 13" and the insertion opening of the bearing is correspondingly configured.

The bearing shafts 11, 11', 11" shown in FIGS. 1 to 10 are connected to the covering device 5 and the bearing 10 is connected to the machine frame 3. However, this type of arrangement is not critical to the operation of the device according to the invention. Alternatively, the bearing shaft in each case could also be connected to the machine frame 3 and the associated bearing to the covering device 5. It is furthermore not critical whether a hinge 4, 4', 4" has a long bearing shaft 11, 11', 11" with a correspondingly long bearing 10, 10', 10" or whether the hinge has several short bearing shafts and bearings. It is even conceivable to combine a long bearing shaft with a plurality of short bearings. The aforementioned design features result in additional functions, for example making it possible to distinguish between the covering devices 5 of a plurality of machines 2 along a processing line 1, or using only one fastening option for the covering device 5 on the machine 2, for which the device is intended.

It is furthermore not important to the invention whether the basic shape of the bearing shaft and the corresponding bearing bore is cylindrical. It is also conceivable to have bearing shafts with detachment surfaces formed by several coaxial cylinders with different diameters, or which have surfaces that are conical or spherical in shape. According to one simplified design, the bearing shaft can have a circular cross section without detachment surfaces, wherein the width of the insertion opening must correspond at least to the diameter of the bearing shaft, thus eliminating the locking function.

A hinge 4''' according to a further embodiment, shown in FIG. 11, is designed such that it can be detached in an axial direction. The bearing 10''' is provided with cylindrical bearing bores 12''' into which the bearing shafts 11''' can be inserted or from which they can be removed by moving them in the axial direction. Alternatively, the bearing 10''' and the bearing shaft 11''' can also have a conical shape. A separate insertion opening for radial displacement of the bearing shaft 11''' and bearing 10''' is not required because the bearing bore 12''' itself forms an opening for axial displacement of the bearing shaft 11''' and bearing 10'''. The bearing shafts 11''', which are connected for this example by a handle 18, are positioned axially displaceable inside holders 20 that move along guides 19 on the covering device 5.

If the covering device 5 is closed, the bearing shafts 11''' are inserted into the bearing bores 12''' and the covering device 5 is secured form-locking inside the bearing bores 12'''. To open the covering device 5 on the front operating side 6, the form-locking connection can be released by displacing the bearing shafts 11''' in the direction E for unlocking it, and the covering device 5 can subsequently be swiveled around the rear swiveling axis 9. The bearing shafts 11''' can be pre-stressed counter to the unlocking direction E with the aid of springs that are not shown herein. The covering device 5 can be opened in the same way on the rear operating side 7 by swiveling it around the front swiveling axis 8. If the hinges are detached simultaneously on the front operating side 6 and the rear operating side 7, the covering device 5 can be removed completely from the machine frame 3. Referring to FIGS. 4-9, it is also conceivable to position the bearing shafts so as to be displaceable on the machine frame 3 and to arrange the bearings on the covering device 5 as graphically depicted in these figures.

It will be understood that the above description of the present invention is susceptible to various modifications, changes and adaptations, and that the same are intended to be comprehended within the meaning and range of equivalents of the appended claims.

What is claimed is:

1. An arrangement for covering a machine having a machine frame, comprising:
   a covering device adapted to be attached to the machine frame above the machine, the covering device having opposite sides corresponding to opposite sides of the machine frame; and
   hinges respectively connected at the opposite sides of the covering device and the opposite sides of the machine frame, the hinges having respective parallel-extending swiveling axes about which the covering device is selectively swiveled to an open or a closed position relative to the machine, wherein each one of the respectively arranged hinges includes a first hinge part connected to the covering device and a second hinge part connected to the machine frame, the first hinge part is one of a bearing and a bearing shaft and the second hinge part is the other of the bearing and the bearing shaft, each of the bearings includes a bearing bore that receives the respective bearing shaft and the respective bearing shaft is pivotable about the respective swiveling axis in the respective bearing bore, each bearing shaft comprises a circular-shaped segment presenting a detachment surface that extends parallel to the respective swiveling axis, each of the bearings includes a narrowed-down insertion opening which ends in the respective bearing bore and which insertion opening has a width that is at least as wide as the respective bearing shaft in a region of the respective detachment surface and that is smaller than the diameter of a circle defining the circular-shaped segment of the respective bearing shaft, so that the first and second hinge parts of a non-selected one of the hinges that does not form the swiveling axis for opening the covering device are detachable from one another.

2. The arrangement according to claim 1, wherein the machine is disposed in a processing line containing a plurality of machines for producing printed products.

3. The device according to claim 1, wherein the bearing shaft and the bearing of the non-selected one of the hinges that does not form the swiveling axis are displaceable relative to each other in a radial direction with respect to a longitudinal axis of the non-selected bearing shaft to detach the non-selected hinge parts.

4. The device according to claim 1, wherein for each of the bearing shafts, the respective detachment surface intersects the respective circular-shaped segment.

5. The device according to claim 1, wherein for each of the hinges, the bearing shaft is connected to the covering device.

6. The device according to claim 1, wherein the hinge parts are arranged so that the hinge parts of both hinges are detachable from one another at the same time so that the covering device is liftable off the machine frame.

7. The device according to claim 1, wherein the insertion opening is formed by flat surfaces.

\* \* \* \* \*